June 11, 1946.  J. C. TROTTER ET AL  2,401,989
ORDNANCE
Filed Oct. 15, 1942  4 Sheets-Sheet 3
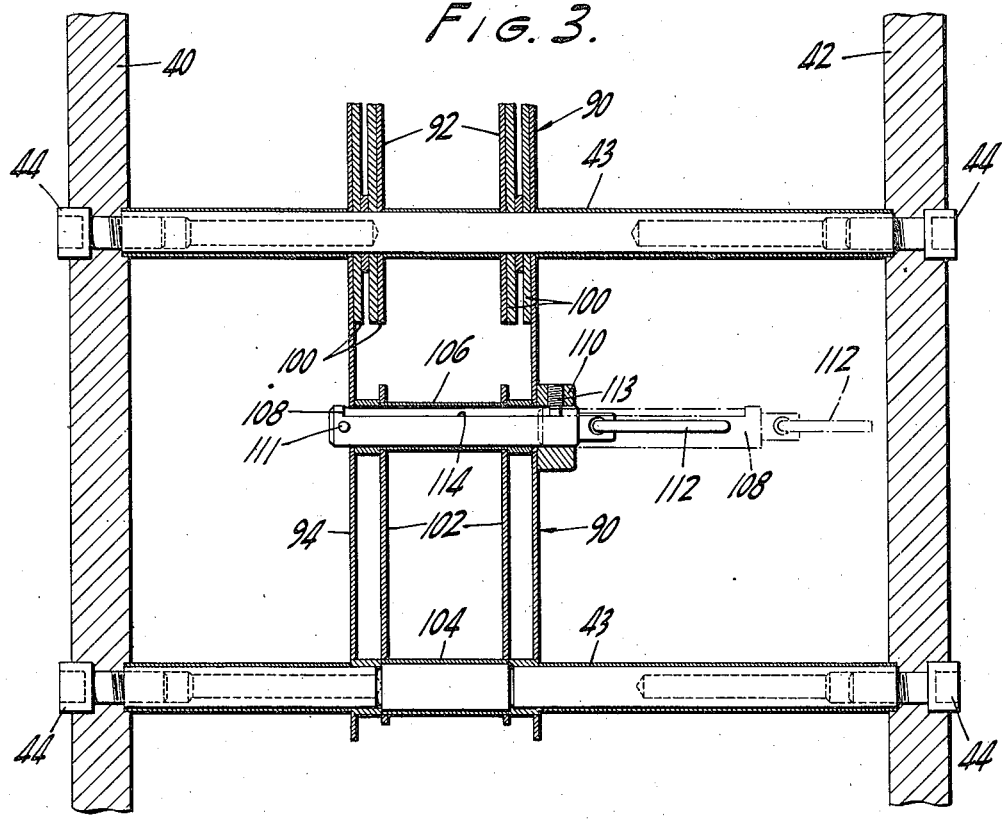
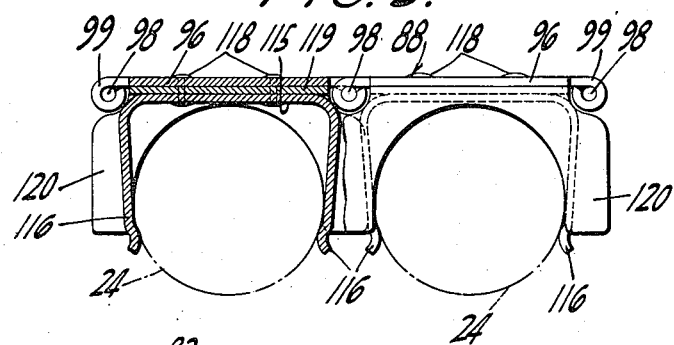
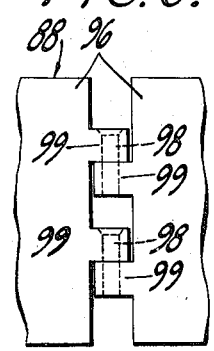
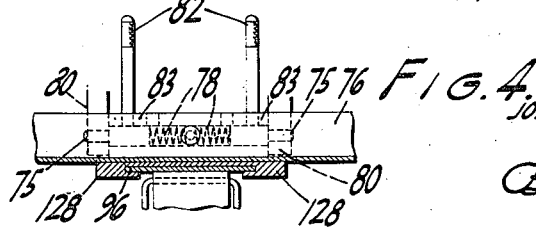
INVENTORS
JOHN C. TROTTER, LEONARD W. HOLLAND
AND GERARD E. SCHULTZ
BY
Bean, Brooks, Buckley & Bean,
ATTORNEYS June 11, 1946. J. C. TROTTER ET AL 2,401,989
ORDNANCE
Filed Oct. 15, 1942 4 Sheets-Sheet 4
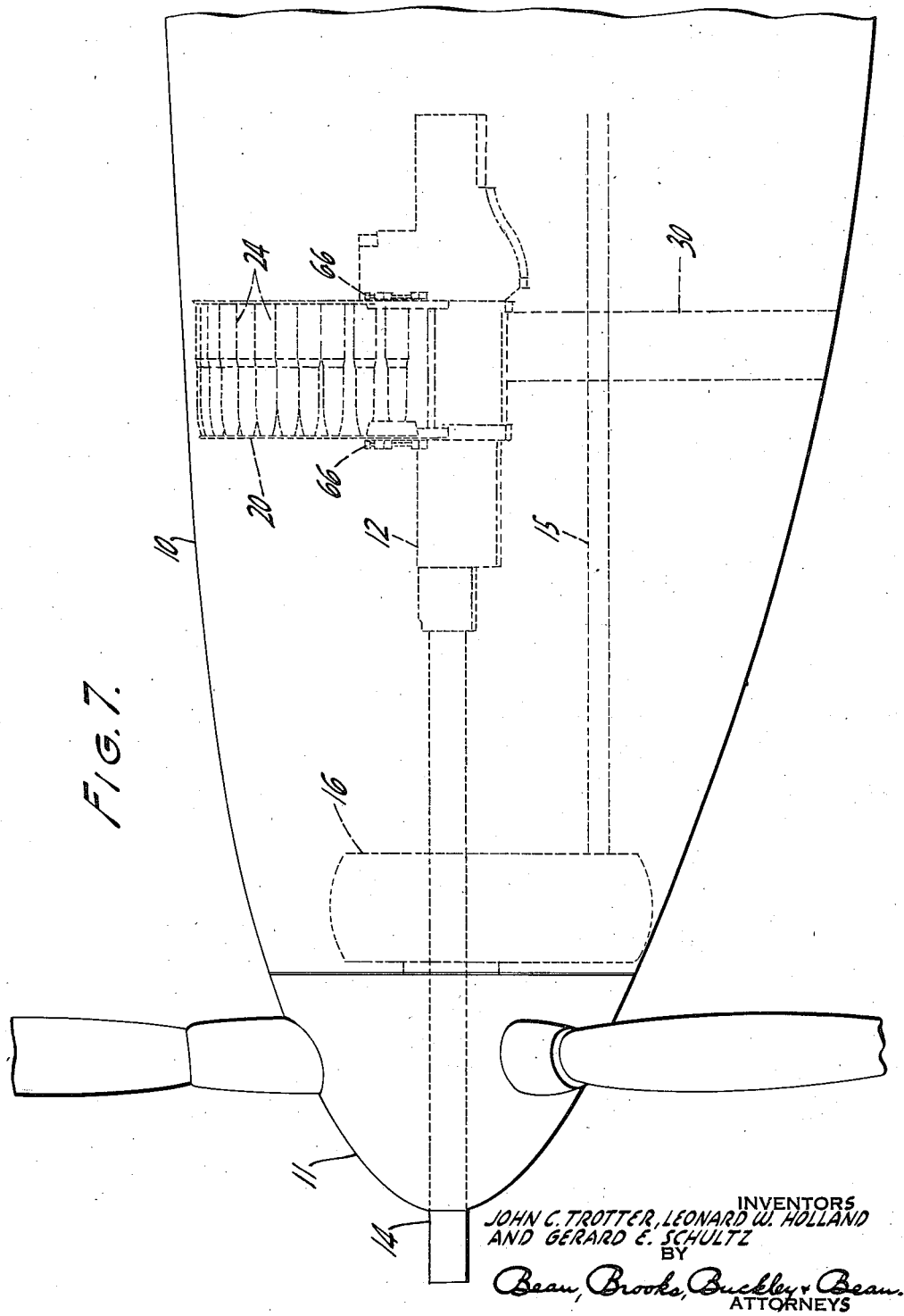
INVENTORS
JOHN C. TROTTER, LEONARD W. HOLLAND
AND GERARD E. SCHULTZ
BY
Bean, Brooks, Buckley & Bean.
ATTORNEYS Patented June 11, 1946

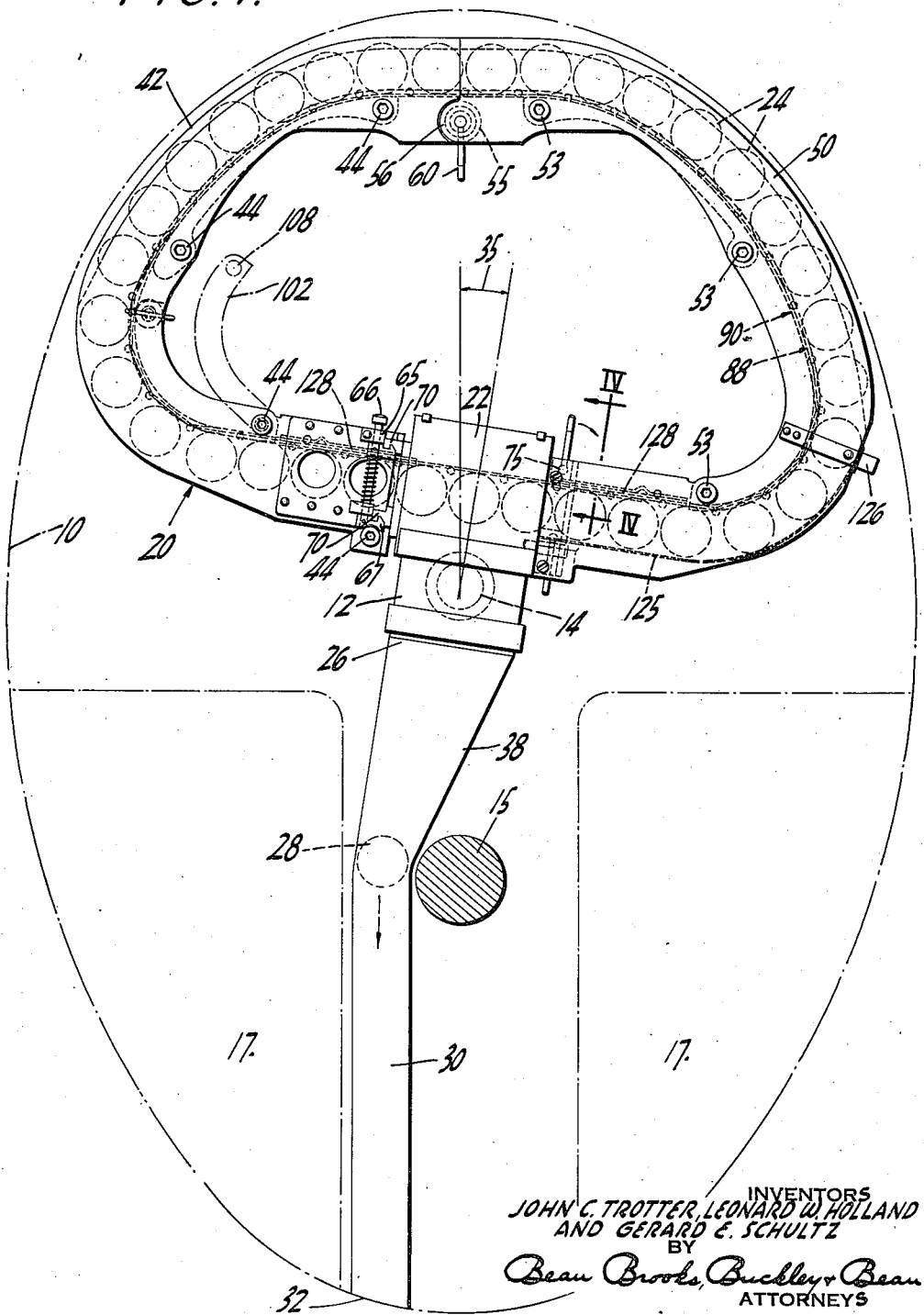

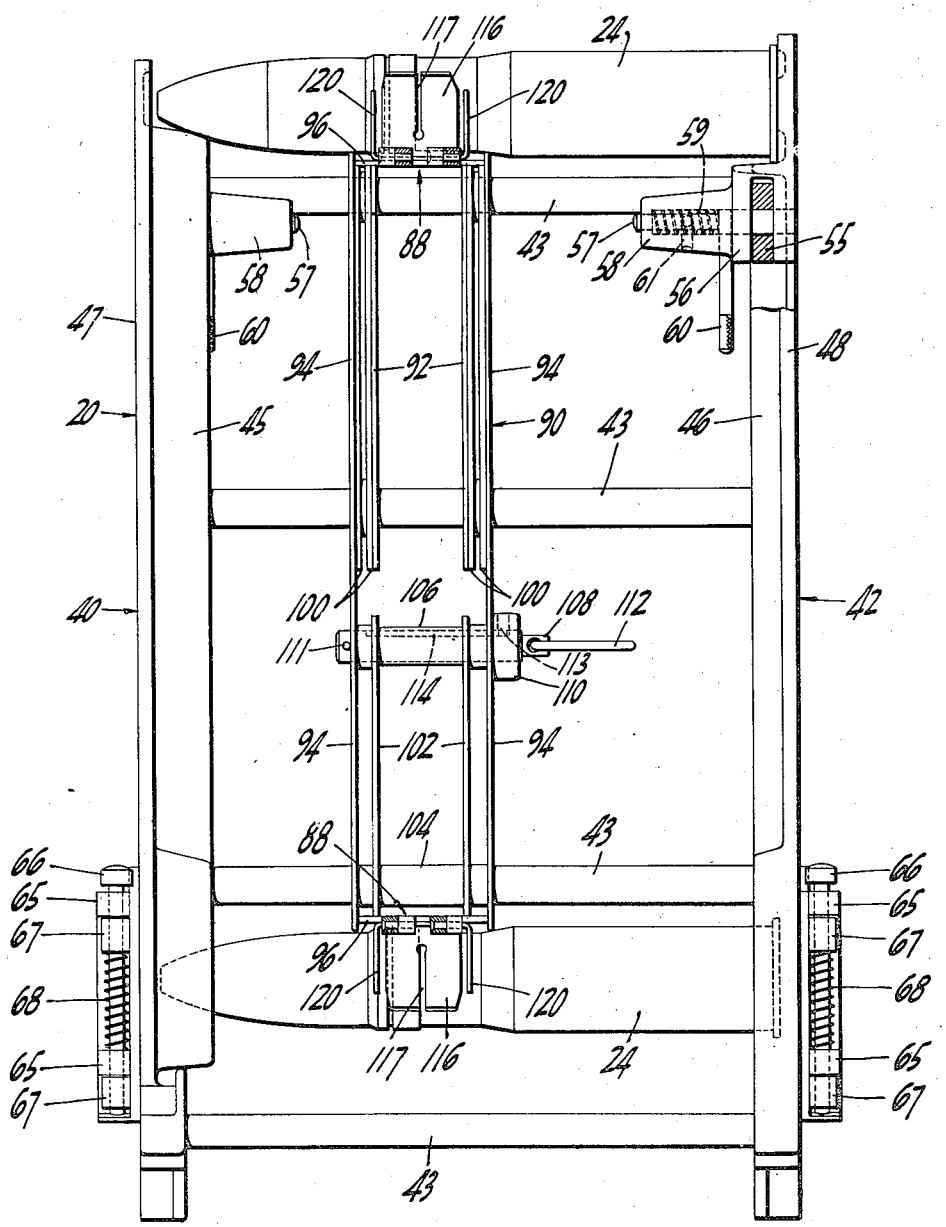

2,401,989

UNITED STATES PATENT OFFICE 2,401,989

ORDNANCE

John C. Trotter, Williamsville, Leonard W. Holland, Kenmore, and Gerard E. Schultz, Buffalo, N. Y., assignors to Bell Aircraft Corporation, Buffalo, N. Y.

Application October 15, 1942, Serial No. 462,108

8 Claims. (Cl. 89—33)

This invention relates to ordnance, and more particularly to ammunion magazine and ejected ammunition parts conveying means for use in conjunction with combat aircraft. The invention is specifically concerned with the problem of feeding ammunition to a relatively heavy rapid fire gun, such as an aerial cannon, or the like, which is fixed upon an aircraft fuselage or nacelle to fire along the approximate longitudinal center line thereof and to be disposed in close proximity to the aircraft propulsion mechanism such as the propeller drive shaft, or the like.

It is generally known that a particularly effective type of fighter airplane comprises a fuselage arrangement of streamline cigar-like form having a tractor propeller mounted at the nose thereof and concentric with the approximate longitudinal center line thereof, and mounting a cannon in such manner as to fire through the hollowed hub of the propeller. In such case the propeller is driven through means of a gear arrangement connected to an engine driven shaft which lies parallel to and slightly below the coinciding propeller rotation axis and cannon barrel axis. Thus, the cannon is mounted within the fuselage at approximately the center of the nose portion thereof while the engine drive shaft is disposed at a position therebelow and closely parallel to the cannon, regardless of whether the aircraft engine is mounted in closely coupled relation within the fuselage nose or at the end of an extended drive shaft reaching back into the region of the longitudinal mid-section of the aircraft fuselage.

In any case the aircraft propeller drive mechanism is thereby disposed immediately below the cannon referred to, and prior art arrangements of this type of combat aircraft have involved certain functional disadvantages and objections because of the arrangements provided incidental thereto for conveying the cannon ejected ammunition cases around the closely proximate propeller drive mechanism. It is known, for example, that the presently standard types of aerial cannon are so designed and constructed as to be adapted to expel ejected cartridge cases therefrom through ejection ports extending through the bottom wall of the cannon casing and directed straight downwardly therefrom. Due to the space and functional requirements of the cannon mechanism it is impractical to redesign the case ejection means thereof so as to direct the ejected cases in any other direction. Consequently, in the case of prior art combat airplane arrangements involving the problems stated hereinabove, it has been customary to form the empty case ejection chute leading from the cannon so as to curve away from the initial downward direction of case ejection movement; first laterally, and then downwardly again, in reversed or S curve form. Due to the fact that the cannon and the propeller drive means to be avoided are in relatively close proximity to one another, the degrees of curvatures referred to must in such instance be extremely sharp; and great difficulty has been experienced in connection with operation of such prior art arrangements due to the tendencies of the ejected ammunition cases to jam at the curved portions of the case ejection chute and to rebound from such curved surfaces when impinging thereagainst so as to oppose ejection movements of following cartridge cases, whereby proper functioning of the cannon mechanism is prevented.

The primary object of the present invention is to avoid the difficulties and disadvantages referred to hereinabove by providing a novel and improved gun mounting arrangement whereby the ejected ammunition part conveying chute means may be constructed of simplified form and to be inherently free from the jamming and function-interfering tendencies referred to. Another object of the invention is to provide in conjunction with the improved gun mount arrangement referred to a novel and improved form of ammunition storing and feeding magazine which is adapted to be mounted in conjunction with the cannon and to nest within the contours of an otherwise ideally shaped nacelle nose portion in improved manner. Another object of the invention is to provide a novel magazine of the character described which is of structurally improved form and adapted to be serviced in improved manner. Other objects and advantages of the invention will appear from the specification hereinafter.

In the drawings:

Fig. 1 is an end elevation of a cannon and magazine arrangement of the invention illustrated in conjunction with the nose portion of a typical nose cannon carrying fighter airplane and in the region of the airplane propeller drive shaft;

Fig. 2 is a side elevation of the magazine of Fig. 1, on an enlarged scale, with the ammunition carrier thereof shown in section;

Fig. 3 is a fragmentary sectional view, on an enlarged scale, of a portion of the magazine structure of Fig. 2;

Fig. 4 is a fragmentary section, on an enlarged scale, taken along line IV—IV of Fig. 1;

Fig. 5 is a fragmentary view, partly in elevation and partly in section, of the ammunition carrier device thereof;

Fig. 6 is a fragmentary plan of a joint portion of the device of Fig. 5; and

Fig. 7 is a fragmentary side elevation of the airplane of Fig. 1 showing the cannon and magazine arrangement thereof.

The drawings illustrate the invention in conjunction with an airplane fuselage or nacelle of typical cigar-like form having a nose portion covered by a skin structure of oval sectional form as indicated at 10. The airplane mounts a tractor propeller having a hollow hub 11 (Fig. 7) and a rapid fire gun of the so-called aerial cannon type comprising generally a casing portion 12 and a gun barrel 14 which extends coaxially with the longitudinal center line of the fuselage intersecting the apex of the nose portion thereof. Thus, the tractor propeller of the airplane is mounted at the extreme nose of the nacelle coaxially with the cannon barrel 14 whereby the latter protrudes through the hollow hub of the propeller for firing in the direction of flight without requiring the use of any gun-propeller synchronizing mechanism, as is well understood in the art. The propeller drive shaft is indicated at 15 as being disposed in the vertical plane of symmetry of the airplane nacelle 10 and at a position slightly below the cannon 12; and at its forward end the drive shaft 15 connects with the propeller through means of any suitable gearing mechanism indicated at 16 and extends rearwardly into driving connection with the crank shaft of the airplane engine through any suitable intermediate coupling devices (not shown).

Thus, it will be understood that the airplane fuselage 10 may be shaped of ideally streamlined form and of ovate sectional contour, as shown, whereby the relatively bulky engine mechanism thereof may be most effectively accommodated within the fuselage at the region of greatest sectional dimensions thereof while permitting the tractor propeller to be mounted at the tip of the fuselage nose at approximately the geometric center of the fuselage section for optimum aerodynamic performance. Because of the offset position of the drive shaft 15, the cannon 12 may be readily positioned coaxially with the propeller hub without interfering with the propeller driving mechanism, while the space within the fuselage above the cannon may be utilized for accommodation of the cannon feeding ammunition magazine. As indicated at 17—17, the spaces within the aircraft fuselage to either side of the propeller drive shaft 15 are invariably required to be occupied by functional elements of the aircraft.

As indicated generally at 20 an ammunition magazine comprising essentially a cartridge-carrying track of semicylindrical sectional form is arranged to have its opposite converging lower end portions disposed in registry with the ammunition feedway portion 22 of the gun, and to be so shaped as to extend laterally therefrom in opposite directions toward the sides of the airplane fuselage and thence in converging looping directions upwardly and over so as to conform closely to the inner wall of the fuselage skin. Thus, the magazine provides a continuous circular passageway for ammunition which is in open communication with the ammunition feedway of the gun. Due to the sectionally curved form of the fuselage structure, the upper section of the magazine trackway is permitted to curve into close conformity with the adjacent portion of the fuselage skin without requiring sharp changes in direction of ammunition movements through the magazine; and a circular type ammunition magazine of maximum capacity and otherwise improved form is thereby provided. As will be explained more fully hereinafter, an ammunition carrier is arranged in conjunction with the magazine trackway to interconnect the ammunition rounds of the magazine, and thus the magazine is adapted to be initially loaded with ammunition rounds as indicated at 24 for successive feeding to the cannon charging mechanism upon simple revolution of the ammunition train about the magazine trackway toward the position of the gun ammunition feedway. As the gun fires successive rounds of ammunition the ammunition feed pawl mechanism of the gun (not shown) motivates succeeding ammunition rounds from the magazine into the charging breech of the gun; and the carrier is thereby automatically moved so as to insure proper feeding of a successive round from the magazine as each preceding round is fired. Special provisions are made for facilitating loading of the magazine with fresh ammunition and servicing of the magazine and replacement of the gun-magazine unit under warfare service conditions, as will also be explained more fully hereinafter.

The gun 12 is illustrated (Fig. 1) as having the customary empty case ejection port as indicated at 26 directed through the bottom wall of the gun casing and in a direction normal thereto; and it will be understood that as the gun fires the empty cases of the ammunition rounds 24 will tumble downwardly out of the port 26, as indicated at 28. To guide the empty cases 28 as they issue from the cannon so as to prevent interferences thereby with other functioning parts of the airplane, a chute 30 (Fig. 1) is provided to engage at its upper end in open communication with the case ejection port 26 of the gun and to discharge the empty cases 28 through a suitably apertured portion of the fuselage skin, as indicated at 32. Or, in the alternative, a suitable container may be arranged within the belly of the fuselage to receive the ejected ammunition cases as they issue from the chute 30.

To facilitate passage of the ejected cases from the gun 12 through the chute 30, the gun is mounted upon the airplane in novel manner and the chute 30 is formed of novel configuration. To this end the gun 12 is mounted upon the fuselage 10 so that the vertical axes of the gun and the fuselage diverge at a substantial angle, say 8 to 10 degrees, such as is indicated at 35 in Fig. 1. In other words, the gun is displaced angularly about its longitudinal axis from normal position. Thus, the empty case ejection port of the gun will be canted in a direction having a substantial horizontal component whereby the empty cases will be initially propelled from the gun toward one side of the propeller drive shaft 15. Hence, the chute 30 may be formed as illustrated in Fig. 1 to include only one relatively large radius bend at a position immediately adjacent the drive shaft 15, to accommodate free passage of the ejected cases from the cannon and past the drive shaft to one side thereof and thence downwardly to the case discharge position.

As explained hereinabove, the airplane fuselage usually includes structural and functional elements in the regions indicated at 17—17, whereby it is undesirable to direct the empty case chute 30 laterally therethrough. In other cases, the chute 30 could be of completely straight line form in view of the novel arrangement of the cannon 12; and the empty cases would be thereby directed to tumble freely away from the gun and to one side of the drive shaft 15 to the chute discharge position. In any case, it will be understood that by reason of the novel gun mounting arrangement the case discharge chute 30 may be so formed as to avoid the remotest possibilities of interference with smooth flow of cases from the cannon, whereby optimum functioning of the gun will be assured. As indicated at 38 (Fig. 1) the portion of the chute between the positions of the drive shaft 15 and the case ejection port 26 of the gun will be preferably smoothly funneled to connect the relatively wide mouth of the empty case ejection port of the gun to the sectionally constricted lower portion of the chute 30. By reason of such arrangement the empty cases will be smoothly fed into the constricted lower portion of the chute 30, and the latter may be formed of a sectional thickness only slightly greater than the largest diameter measurement of the ammunition cases being handled, whereby the chute 30 will be "tailored" to its minimum practical thickness for space-saving purposes while being adapted to accommodate the empty cases in jam-free sliding relation.

To feed the gun 12 with ammunition rounds, the magazine 20 is provided to comprise an ammunition trackway which when assembled in conjunction with the gun comprises a continuous trackway integral with the gun and looping thereabove. To facilitate assembly and servicing of the magazine-gun unit the trackway comprises a pair of sections disposed at each side of the gun and detachably joined together at their top ends when in assembled relation. Fig. 2 is a side elevation of the left-hand section of the trackway of Fig. 1 looking inwardly of the fuselage from externally thereof. This section comprises generally a pair of arcuately shaped front and rear rails 40—42, respectively, which are mounted in parallel spaced relation by means of a series of spacer tie rods 43. As illustrated in detail in Fig. 3, the tie rods 43 are formed to abut between the rails 40—42 and to be firmly connected thereto by means of cap screws 44. The rails 40—42 are of flanged formation so as to provide simultaneously bottom track portions 45—46 and guiding end wall portions 47—48 (Fig. 2); and the opposed end wall portions 47—48 are so relatively spaced as to be adapted to maintain the ammunition rounds against axial displacement from the magazine trackway while permitting the ammunition rounds to freely slide in side-by-side relation upon the bottom rail portions 45—46 of the trackway. The right-hand section of the trackway is of generally identical construction in that it comprises opposed flanged rails 50—50 which correspond to the rail members 40—42 hereinabove described, and it will be understood that the rails 50—50 will be interconnected by means of spacers which are similar to the spacers 43 of Fig. 2 and connected thereto by means of cap screws 53 (Fig. 1).

Because of the canted mounting of the gun 12 the trackway sections will necessarily be of somewhat differently curved sectional form, as clearly illustrated in Fig. 1, to the end that their upper portions may curve into close conformity with the interior of the fuselage shell; but it will be understood that at their upper meeting end portions the trackway sections will be of identical opposite formation so as to be adapted to abut one another to provide a continuous ammunition trackway of interiorly uninterrupted form. The rail members of the trackway sections are formed at their upper meeting end portions with paired extending ears which are adapted to overlap when in magazine assembled condition as indicated at 55—56 (Fig. 2) in such manner that their apertured portions register with corresponding slip pins 57—57 carried by bracket portions 58—58 extending from the rails. A compression spring 59 is mounted in conjunction with each of the pins 57—57 for biasing the latter toward rail interlocking position, and a finger 60 is formed to extend from each of the pins 57—57 so as to be adapted to be manually manipulated to cause the pins to be moved out of locking position against the action of the springs 59. Each bracket 58 is longitudinally slotted to permit the corresponding control finger 60 to protrude therethrough to allow the latter to be manipulated in directions parallel to the axis of the pin for pin controlling actuation. Also, the bracket is radially slotted as indicated at 61 (Fig. 2) to permit the pin 60 to be rotated into the locking slot 61 when in pin-retracted position so as to withhold the pin 57 from moving into locking position except when desired.

The trackway sections are arranged to be detachably connected to opposite sides of the gun ammunition feedway portion 22 so as to be adapted to be quickly removable therefrom in connection with servicing of the magazine-gun unit. To this end, the left-hand trackway section is illustrated as carrying by means of paired perforating ears 65 a latch pin 66 which in turn carries a pair of rigidly extending latches 67—67. The latches 67—67 have upwardly turned end portions for latching engagement with complementarily recessed portions of corresponding lug members 70—70 extending from the gun casing portion 22; and the parts are so proportioned and arranged that whenever the lower end of the trackway section is disposed in abutting open communication relation with respect to the ammunition feedway port of the gun casing 22 the pins 66—66 may be released to move upwardly in response to the action of their compression springs to firmly latch the trackway section to the gun.

The right-hand section of the magazine trackway is illustrated as being detachably connected to the gun casing by means of paired locking pins 75—75 which are carried upon the trackway structure by means of suitable cross bracket elements 76. The pins 75—75 are slidably mounted within suitably bored portions of the bracket 76 and are each backed by means of a compression spring 78 so as to be normally biased outwardly to engage at their extending end portions within suitably perforated ears 80 extending from the gun casing 22. Each locking pin 75 carries integrally therewith a laterally extending control finger 82 which protrudes through a suitably slotted portion 83 of the bracket 76, whereby the fingers 82—82 may be simultaneously manually manipulated toward each other against the actions of the springs 78—78 so as to withdraw the pins 75—75 from engagement with the gun casing, whereupon the trackway section may be readily removed from connection with the gun.

Thus, it will be appreciated that the magazine trackway may be readily assembled or disassembled relative to the gun 12 by simply fitting or unfitting the detachable connection devices referred to in the manner described, whereby when the device is in assembled position a continuous ammunition trackway of generally circular sectional form is provided in open communication with the ammunition feedway portion of the gun casing, and whereby the magazine trackway may be quickly removed from the gun by disconnecting the locking mechanisms at the top of the trackway and at the points of connection with the gun, in the manner described.

To articulate the ammunition charge of the magazine and to hold the ammunition within the magazine against accidental displacement therefrom, a carrier in the form of an endless chain is threaded about the magazine trackway at its approximate longitudinal mid-section. For this purpose the trackway frame mounts a carrier slideway structure which is indicated generally at 90 as comprising a pair of spaced rail portions 92—92 which are supported by the tie rods 43 of the trackway frame. The rails 92—92 are outwardly faced to conform to the path of ammunition travel about the trackway structure, and are disposed in parallel spaced relation so as to provide therebetween a slide track for the carrier chain 88. Each of the rails 92—92 is accompanied by a similarly mounted and closely adjacent end plate 94, whereby a pair of opposed abutments are provided to extend at each side of the carrier track to guide the carrier against lateral displacement from the slide track.

The carrier 88 comprises specifically a plurality of base plates 96 which are connected in articulated relation at each juncture between adjacent plates by means of a pair of pins 98 extending through paired registering apertured lug portions 99 of the plates 96 (Fig. 6). The headed end portions of the pins 98—98 are preferably fixed within the corresponding lug portions 99—99 of the carrier plate while the extending end portions of said pins are formed to freely slide-fit within the corresponding apertured lugs of the next adjacent plate. Thus, it will be understood that the carrier chain may be readily assembled or disassembled by simple lateral displacement movements of any one plate member 96 relative to the plate member next adjacent thereto; but that upon final assembly of the carrier chain and mounting thereof upon the slide track 90 between the end plates 94—94 thereof, lateral displacement of one plate element relative to the next adjacent element will be prevented by the guide plates 94—94, whereby accidental disconnection of the carrier chain is prevented.

To enable the carrier chain 88 to be assembled in close fitting relation upon the slide track 90 and to facilitate ready disassembly therefrom for servicing purposes, the slide track 90 is interrupted at one curved section thereof by means of a hinged track portion which is adapted to be swung inwardly so as to reduce the minimum perimetral dimension required to encompass the carrier slide track. Thus, the carrier chain may be assembled upon the slide track by laying a train of connected plate elements 96 about the slide track and then bringing the opposite ends of the train of plates into interengagement by registering the end pin and lug connection devices and then moving the end plates laterally relative to each other into hinged position. Thereupon the hinged section of the slide track may be adjusted outwardly into its position of normal alignment with the major portion of the slide track, whereby to tauten the carrier chain against the slide track in such manner that the slide chain will be engaged between the end plates 94—94 for suitable guiding action thereby, while the carrier chain is free to slide about the slide track. To this end the track rails are interrupted as indicated at 100 (Figs. 2 and 3) and the space therebetween is arranged to be normally occupied by a pair of similarly spaced track portions 102—102 which are pivotally mounted upon one of the tie rods 43 by means of a ferrule 104. At their upper ends the track pieces 102—102 are interconnected by means of a sleeve 106. A locking pin 108 is slidably carried upon a suitably apertured boss portion 110 of one of the end plate members 94 so as to be normally in registry with the tubular tie member 106 so as to be insertable therethrough and into registry with an opposed suitably apertured portion of the opposite end plate 94 whereby to lock the upper ends of the rails 102—102 into positions of smooth continuation with respect to the uninterrupted rail portions 92—92. A spring pressed ball 111 is mounted to extend from the locking pin 108 to provide a spring-latch arrangement relative to the adjacent side plate 94 to prevent unintended sliding of the pin 108 relative to the track assembly. A finger ring 112 is connected to the pin 108 to facilitate manual manipulation of the latter and it will be understood that upon sliding withdrawal of the pin 108, as to the broken line position thereof shown in Fig. 3, the rail structure 102—102—16 will be free to rotate inwardly about the hinged axis of its lower end, as to the broken line position thereof illustrated in Fig. 1. A set screw 113 is threaded through the boss 110 so as to extend in free sliding relation within a keyway 114 of the pin 108, whereby axial movements of the pin are limited in each direction.

Hence, it will be understood that when the hinged track portion 102—102 is in the broken line position thereof illustrated in Fig. 1, the carrier chain may be readily mounted upon the slide track by laying a train of links thereabout and then pulling the opposite ends thereof together in the manner described hereinabove, whereupon the hinged track section 102—102 may be swung outwardly and locked into its normal position of continuation with the remainder of the track section, whereby the carrier chain will be automatically tautened in proper operating condition and will be thereby retained behind the end wall members 94—94 for guiding of the carrier chain and preventing the latter from becoming accidentally disconnected.

The carrier base plates 96 are each provided with upstanding spring finger devices for resiliently gripping the corresponding ammunition rounds at approximately the position of the longitudinal center of gravity thereof; and the spring fingers are so provided as to grip the ammunition rounds sufficiently to prevent accidental displacement of the rounds from the carrier chain but to permit the rounds to be plucked therefrom by the gun ammunition feed pawl mechanism as each successive ammunition round moves into the range thereof. For this purpose each base plate 96 is provided with a U-shaped spring metal clip device having a base portion 115 and opposite upstanding finger portions 116—116 which are slotted as indicated at 117 to enhance the flexibility of the grip thereof. The clips are mounted upon the base plates 96, as being riveted thereto as indicated at 118 (Fig. 5), and a cradle device comprising a base portion 119 and opposite upstanding cradle end portions 120 is engaged between each base plate element 96 and the corresponding clip elements 115—116. Thus, each base plate of the carrier chain is adapted to hold a corresponding ammunition round by means of the resilient finger pieces 116—116 cooperating with the cradle plate devices 120—120, and yet it will be understood that the ammunition rounds are at all times free to be plucked away from the carrier chamber by the feed pawl mechanism and the gun as explained hereinabove.

It will be appreciated that the magazine of the invention may be loaded from exteriorly of the airplane by simply removing detachable cover plate portions of the airplane skin in the region of the magazine and then pressing individual ammunition rounds into engagement with the spring finger elements 116—116 of each carrier chain base plate, whereupon the carrier chain may be manually revolved upon the magazine trackway so as to bring the leading ammunition round into connection with the feed pawl mechanism of the cannon. Upon final filling of the remainder of the carrier chain, as explained hereinabove, and replacement of the cover plates embracing the magazine, the airplane is ready for combat duty and the cannon may be fired at will until the ammunition rounds are expended. It will be understood that this ammunition feeding operation will be accomplished by the customary feed pawl mechanism of the gun proper which forms no part of the present invention but which operates to draw successively presented ammunition rounds into the breech charging mechanism of the gun; and that the carrier chain 88 operates to cause each fired ammunition round to be immediately followed by a fresh round, until the magazine is empty.

To prevent unintended displacement of ammunition rounds from the bottom strand of the ammunition carrier, as upon bumping of the airplane upon a landing surface or the like, the magazine trackway is preferably provided with a bottom wall portion as indicated at 125 (Fig. 1). The device 125 will preferably be provided in the form of a cover plate which may be slidably or otherwise inserted upon the magazine trackway at its inner end and detachably connected thereto at its outer end by means of a latch mechanism as indicated at 126. Also, to guide the carrier chain into accurately registering relation with respect to the ammunition feed pawl mechanism of the cannon, it is preferred to provide the magazine trackway lower end portions with parallel spaced guide flanges 128 (Figs. 1 and 4) which are adapted to slidably fit the side edges of the carrier chain base plates 96 and to firmly guide them in accurately aligned relation with respect to the gun ammunition feed mechanism.

Thus, it will be understood that the mechanism of the invention provides a novel and improved gun mount and ammunition magazine and empty case ejection chute arrangement for use in conjunction with a combat airplane of the type specified hereinabove, whereby a gun fitted with the devices of the invention and arranged in accord with the principles thereof is enabled to be fed with ammunition in improved manner and to discharge ejected ammunition cases in improved manner. It will also be appreciated that the mechanism of the invention is particularly adapted to facilitate the problems of servicing the gun and the magazine, and that it is also of simple and otherwise structurally improved form.

We claim:

1. An ammunition magazine for attachment to the feed mechanism of an automatic gun for firing cartridges of longitudinally tapered form, comprising a trackway of generally circular sectional form consisting of a pair of opposed flanged rail structures for engaging said cartridges at opposite ends thereof when disposed upon said trackway in transverse side-by-side relation, a second trackway disposed intermediately of said flanged rail structures and substantially paralleling the profile thereof, said second trackway including a wall structure and laterally extending end plate structures adjacent opposite sides of said wall structure, an ammunition carrier disposed to slidably encompass said wall structure and to be guided thereon by said end plate structure in registry with predetermined portions of said cartridges, said carrier comprising a series of links having opposed finger portions extending therefrom to grip at opposite sides upon corresponding of said cartridges when disposed in side-by-side relation upon said first mentioned trackway whereby said carrier is adapted to articulate the magazine ammunition load, said wall structure having a curved portion thereof hingedly connected to the other portion thereof and adapted to be swung inwardly about the hinged connection to shorten the perimetral distance about said wall structure, said links having at their opposite corresponding ends longitudinally extending registering eye devices and laterally extending pin devices for hinge type connections therebetween, whereby said carrier may be assembled and disassembled relative to said second trackway by climbing it over said end plate structures and laterally displacing connecting eye and pin devices thereof.

2. In combination, a combat aircraft body having a wall of curvilinear vertical transverse sectional form, a gun having an ammunition feedway portion, said gun being fixedly mounted within said aircraft body and aiming substantially longitudinally of said aircraft body and being tilted about the gun longitudinal axis to lean away from strictly upright attitude, an ammunition magazine for said gun of generally ovate annular sectional form being cut away at a portion thereof and mounted to register at opposite sides thereof in open communication with the ammunition feedway portion of said gun and extending therefrom in looped form adjacent the curvilinear wall of said aircraft body portion, and endless belt means mounted within said magazine adapted to engage the ammunition thereof in articulated relation for actuating the ammunition contained within said magazine to feed said gun.

3. In combination, a combat airplane including a body portion of curvilinear vertical transverse sectional form and having an engine drive shaft disposed to extend horizontally and longitudinally within said body portion, a gun mounted within said body portion and disposed to extend substantially longitudinally thereof and above and parallel to said drive shaft and tilted about its longitudinal axis so as to lean away from a strictly upright attitude, and an ammunition magazine for said gun of ovate collar form being interrupted at a portion thereof and mounted thereat in open communication with the ammunition feedway portion of said gun at opposite sides thereof and extending therefrom in looped form adjacent the curving wall of said body portion, and an empty ammunition case ejection chute extending from the bottom of said gun and in line with the leaning attitude thereof so as to extend therefrom without bending to a position at one side of said drive shaft.

4. An ammunition magazine for attachment to the feed mechanism of an automatic gun for firing cartridges of longitudinally tapered form, said magazine comprising a trackway of generally circular sectional form consisting of a pair of opposed flanged rail structures for engaging the ammunition load at opposite ends of the cartridges thereof when the latter are disposed upon said trackway in transverse side-by-side relation, a second trackway disposed intermediately of said flanged rail structures and substantially paralleling the profile thereof, said second trackway including a circuitous shaped wall structure and end plates extending adjacent opposite sides of said wall structure and radially outwardly therefrom, an ammunition carrier disposed to slidably encompass said wall structure and to be guided thereon by said end plates in registry with predetermined longitudinally positioned portions of said cartridges, said carrier comprising a series of flexibly connected links having opposed finger portions extending therefrom to grip at opposite sides upon corresponding of said cartridges when disposed in side-by-side relation upon said first mentioned trackway whereby said carrier is adapted to articulate the magazine ammunition load, said second trackway wall structure having a curved portion thereof hingedly connected to the remainder thereof and adapted to be swung inwardly about the hinged connection to shorten the perimetral distance about said wall structure.

5. An ammunition magazine for attachment to the feed mechanism of an automatic gun for firing cartridges of longitudinally tapered form, said magazine comprising a trackway of generally circular sectional form consisting of a flanged rail structure for engaging said cartridges at opposite ends thereof when disposed upon said trackway in transverse side-by-side relation, a second trackway disposed intermediately of said flanged rail structure and substantially paralleling the profile thereof, said second trackway including a wall structure and a laterally extending end plate structure at a side of said wall structure, an ammunition carrier disposed to slidably encompass said second trackway wall structure and to hug the latter and to be guided thereon by said end plate structure in registry with predetermined corresponding longitudinal portions of said cartridges, said carrier comprising a belt having opposed finger portions extending therefrom to grip upon corresponding of said cartridges when disposed upon said first mentioned trackway whereby said carrier is adapted to articulate the magazine ammunition load, said second trackway wall structure having a curved portion constructed and arranged to be swung inwardly to shorten the perimetral distance about said wall structure whereby said carrier may be assembled and disassembled relative to said second trackway by climbing it over said end plate structure whenever said perimetral distance about said wall structure is so shortened.

6. An ammunition magazine for attachment to the feed mechanism of an automatic gun, said magazine comprising a circular trackway of paired opposed flanged rail structures for engaging ammunition rounds at opposite ends thereof when disposed upon said trackway in transverse side-by-side relation, a second trackway disposed intermediately of said flanged rail structures and formed to substantially parallel the profiles thereof, said second trackway including a sectionally curved wall structure and radially extending end plates at opposite sides of said wall structure, an ammunition carrier disposed to slidably encompass said wall structure and to be guided thereon by said end plates, said carrier comprising a series of flexibly connected links having finger portions extending therefrom to engage corresponding rounds of ammunition when disposed in side-by-side relation upon said first mentioned trackway whereby said carrier is adapted to articulate the magazine ammunition load, said wall structure having a curved portion thereof hingedly connected to other portions thereof and adapted to be swung inwardly about the hinged connection to shorten the perimetral distance about said wall structure.

7. An ammunition magazine for attachment to the feed mechanism of an automatic gun which is adapted to receive articulated ammunition rounds when fed thereto in a laterally directed path, said magazine comprising a trackway paralleling the path of the ammunition load leading into the feed mechanism of the gun, guide flanges at opposite sides of said trackway, a carrier slidably supported in the trackway and arranged to normally hug the trackway in close fitting relation between said flanges and comprising a series of flexibly connected plate members, gripping means extending from each of said plate members for receiving and detachably holding cartridges of said ammunition load, said plate members being formed with complementing hinge pin and eye devices at corresponding opposite ends thereof whereby adjacent of said plate members are adapted to be relatively assembled and disassembled by relative lateral displacements thereof for carrier assembly and disassembly purposes, means on said trackway for manual manipulation to shrink the perimetral dimension thereof to permit said carrier to clear said guide flanges whereby said plate members may be laterally displaced for carrier assembly and disassembly purposes.

8. In combination, a combat aircraft including a streamlined body having a longitudinal streamline axis, an aircraft propeller having a hollow hub and mounted at one end of said body to rotate about said axis, a gun fixedly mounted within said aircraft body and having the gun barrel thereof extending along said axis and through said hollow propeller hub, said gun having a gun mechanism casing and an ejected ammunition parts passageway extending therethrough, said gun being canted relative to said aircraft body so as to direct said passageway away from the vertical, said gun mechanism casing portion having an ejected ammunition parts chute device extending therefrom in the same direction of said passageway, a propeller drive shaft mounted within said aircraft body below the position of said gun and extending parallel to said streamline axis and in the vertical plane thereof at a position offset from the direction of extension of said ejected parts chute, and gear means interconnecting said drive shaft and said propeller at a position on said aircraft longitudinally offset from the position of said ejected parts chute.

JOHN C. TROTTER.
LEONARD W. HOLLAND.
GERARD E. SCHULTZ.